No. 621,288. Patented Mar. 14, 1899.
F. W. ROBERTSHAW.
TAP AND DIE.
(Application filed Oct. 16, 1897.)
(No Model.)

Witnesses:

Inventor:
Frederick W. Robertshaw
By Kay & Totten
Attorneys

UNITED STATES PATENT OFFICE.

FREDERICK W. ROBERTSHAW, OF PITTSBURG, PENNSYLVANIA.

TAP AND DIE.

SPECIFICATION forming part of Letters Patent No. 621,288, dated March 14, 1899.

Application filed October 16, 1897. Serial No. 655,375. (No model.)

*To all whom it may concern:*

Be it known that I, FREDERICK W. ROBERTSHAW, a resident of Pittsburg, in the county of Allegheny and State of Pennsylvania, have invented a new and useful Improvement in Dies and Taps; and I do hereby declare the following to be a full, clear, and exact description thereof.

My invention relates to dies and taps for cutting screw-threads.

One of the objects of my invention is to provide a die and tap in which the chasers or cutters if broken may be readily adjusted into position for use again with reference to the remaining ones, so as to act properly in conjunction therewith.

Another object of my invention is to provide a die and tap in which the chasers are adjustable longitudinally and when clamped in position are securely held against any receding or tilting movement.

A further object of my invention is to provide a die and tap in which the parts are so few and simple that they can be readily separated for purposes of sharpening, &c.

To these ends my invention comprises, generally stated, a die stock or holder having seats or recesses formed therein adapted to receive the chasers, said seats having longitudinal serrations or grooves formed in one of the faces of said seats and chasers having corresponding serrations or grooves formed on one of the sides thereof, said serrations or grooves in said seat and said chasers corresponding to the pitch of the thread-cutting faces of the chasers or in proper proportion thereto, so that in case a portion of the cutting edges of the chasers becomes broken the said chaser may still be used by securing it at an elevated position within the seat, while at the same time said chaser when thus adjusted will act properly in the cutting of the threads with reference to the other chasers of the set.

To enable others skilled in the art to make and use my invention, I will describe the same more fully, referring to the accompanying drawings, in which—

Figure 1:
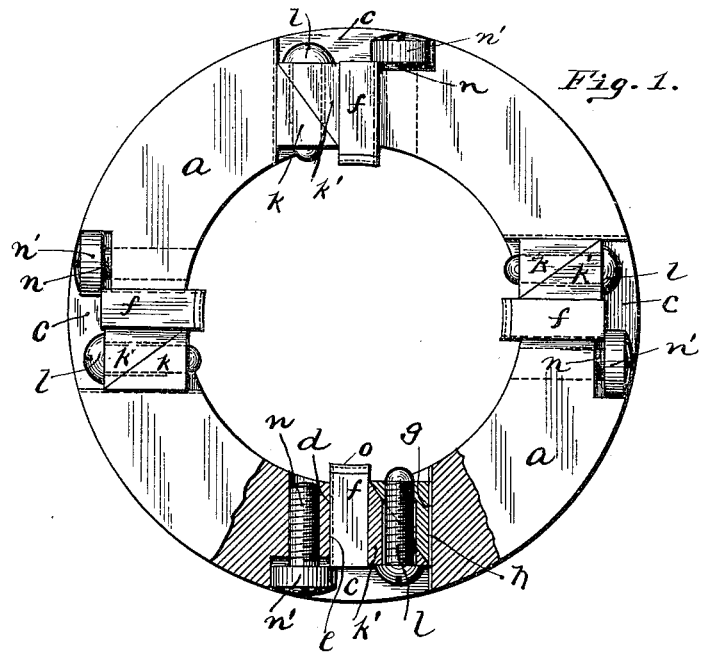
Figure 2:
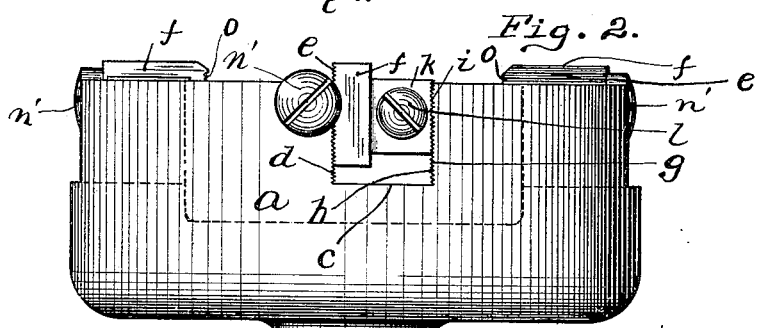
Figure 3:
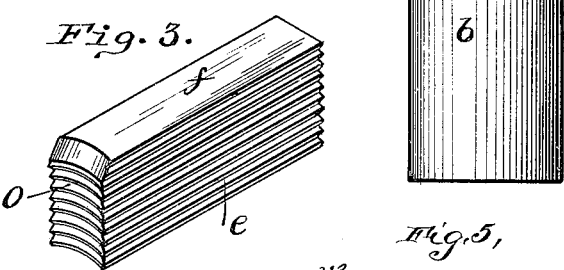
Figure 5:
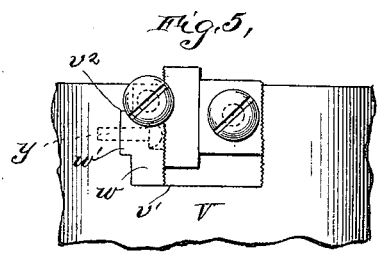
Figure 4:
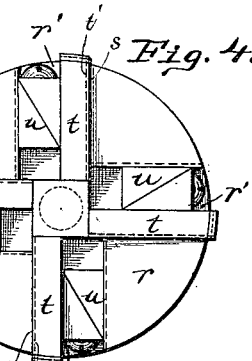

Figure 1 is a face view of a die constructed in accordance with my invention. Fig. 2 is an edge view of the same. Fig. 3 is a view of one of the chasers removed. Fig. 4 is a view of my invention as applied to a tap, and Fig. 5 is a modified form of my invention.

Like letters indicate like parts in each of the figures.

In Fig. 1 I have illustrated my invention in a simple form as applied to a die for cutting screw-threads on the exterior of an object, although, as will more fully hereinafter appear, it is equally applicable to what are generally termed "taps," where the thread is to be formed on the interior of an object.

In the first form, as illustrated in Fig. 1, the letter $a$ represents a suitable die-stock with the extended holder $b$. The die-stock $a$ has the radial seats or recesses $c$ formed at intervals, according to the diameter of the die-stock. One of the sides of the recesses $c$ has the longitudinal serrations or grooves $d$ formed therein, said serrations or grooves corresponding to and coinciding with the serrations or grooves $e$ formed on one of the sides of the chasers $f$, so that when the serrations $e$ on the sides of said chasers engage the serrations $d$ on the sides of the seats $c$ and are clamped within said seats said chasers will be securely held in position, so that they cannot tilt or be forced out of line with each other. In order to clamp said chasers securely within the seats, said seats are provided on their opposite sides $g$ with serrations $h$, with which the serrations $i$ on the one half of the partible wedge-block $k$ are adapted to engage. The other half $k'$ of this partible wedge-block engages the smooth face of the chaser. A tap-screw $l$ passes through a threaded opening in one-half of said partible wedge, so that by tightening said tap-screw the wedge-faces are forced toward each other in such a way as to clamp the chaser securely in position. The serrations on the partible wedge engaging with the serrations on the side $g$ of the seat or recess prevent the slipping of the wedge-block and tend to hold it more securely in place.

In order to regulate the backward movement on the part of the chasers, I provide a stop which in this instance consists of a tap-screw $n$, which enters the die, the head $n'$ of said tap-screw overlapping the outer end of the chaser and preventing its backward movement. By screwing up this tap-screw $n$ the distance to which said chaser may recede may be lessened, or vice versa.

The chasers are provided with the cutting edges or serrations o, said cutting edges corresponding to the pitch of the thread to be given to the object to be threaded and being arranged at right angles to the serrations e. As the serrations d in the side of the seat c correspond to the serrations e in the side of the chaser f, so the cutting faces or serrations o of said chasers preferably correspond to the serrations e and d, for the purpose more fully hereinafter set forth. If, however, the cutting faces or serrations o of the chasers do not correspond in size to the serrations e and d, there is a certain ratio between them in order to provide for the proper adjustment of the chasers, as will more fully hereinafter appear.

When my improved die is in use for the purpose of cutting an external thread, the chasers will have their serrations e engaging with the serrations d in the sides of the seats, and under ordinary circumstances the chasers will be ordinarily well down within their seats. When the chasers have been properly adjusted for cutting, the tap-screw in the partible wedge will be screwed up, so as to hold these chasers securely in place. During the cutting operation, owing to the longitudinal serrations on the chaser engaging with those on the side of the seat, all liability of the tilting or canting of the chasers is obviated, so that they are always held in alinement with each other and a perfect thread on the object operated on is the result. Under ordinary circumstances only the upper cutting teeth or serrations o of the chasers are brought into play in cutting an ordinary thread. The consequence is that when one of the chasers breaks it is usually broken off at the upper end the distance of a tooth or two. By my invention if one of the chasers becomes broken by loosening the tap-screw in the wedge-block the chaser can be withdrawn and the upper edge thereof planed, filed, or ground off to remove the broken portion and reduce the upper edge to the same level as the face of the die-stock. The cutter is also pointed for the necessary lead. The chaser can then be placed back into its seat with its serrations e engaging the serrations d of the seat, and by tightening up the tap-screw the chaser is again in position for work. No nicety of adjustment is required to bring the cutting-faces of the broken chaser into proper alinement with the others, owing to the serrations e corresponding to the cutting faces or serrations o of the chaser, as well as the serrations d of the seat. By this construction the chasers are always in a position with relation to each other to act properly upon the object to be threaded, so as to form a perfect and even thread thereon. The chaser by this operation is simply raised in its seat, and even if it should be broken again it may still be used by repeating the operation just described, so that the life of one of the chasers is lengthened, and when one of a set of chasers is broken it is not necessary to obtain an entire new set or even a new one to replace the one broken.

As stated before, no nicety of adjustment is necessary to bring the cutting edges of the broken chaser into proper line with the other chasers, owing to the presence of the serrations engaging with the serrations of the seat and corresponding to the cutting edges of the chaser. In case the cutting edges of the chaser should be larger than the serrations e and d, then the serrations e and d are made proportional to the cutting edges of the chasers, so that in case the chaser becomes broken one can tell how many teeth the chaser must be moved up in its seat in order to correspond to the teeth which have been broken from the chaser in order bring the remaining teeth into proper alinement with those of the other chasers to form a perfect and uniform thread on the object to be threaded.

In Fig. 4 I have illustrated my invention as applied to a tap. In that figure the letter r represents a suitable stock having the seats r' formed therein for the reception of the chasers. These seats, like those of the die, have the serrations s formed longitudinally thereon, with which the serrations t' along one side of the chasers t engage. A wedge-block u acts in the same manner as before to hold the chasers in position. What has already been said as to the operation of my invention when applied to a die will apply to its operation in connection with a tap, so that a repetition of the detailed description does not seem necessary.

Where the diameter of the stock is increased in size for larger work, I can have the body portion of the stock formed of cast-iron, and in this case I employ the construction shown in Fig. 5. In this view only a portion of the stock v is shown, which has the seat v'. One side of the seat v' has the block w secured thereto, said block having the projection w', which enters a corresponding recess $v^2$ in the stock. A screw y enters a countersunk opening in the block w and is screwed into the stock, whereby said block is securely held in place. The projection w', fitting in the recess $v^2$, prevents any upward movement of the block within the seat v'. The other parts are the same as previously described and need no further description. By this construction the body portion of the stock may be formed of cast-iron, while the side of the seat which engages with the chaser may be formed of wrought-iron or steel and is held immovable in the sense that there is no liability of its being displaced.

What I claim as my invention, and desire to secure by Letters Patent, is—

1. In dies and taps for cutting screw-threads, the combination of a suitable stock having seats formed therein, one of the sides of each seat being immovable and having longitudinal serrations formed therein, a chaser having serrations formed on the side thereof adapted to engage the serrations in said seat, and means for clamping said chaser in said seat, substantially as set forth.

2. In dies and taps for cutting screw-threads, the combination of a suitable stock having seats formed therein, one of the sides of each seat being immovable and having longitudinal serrations formed therein, a chaser having serrations formed on the side thereof adapted to engage the serrations of said seat, the serrations of said seat and said chaser coinciding with and being of the same size as the cutting edges of the chaser, or in proper proportion thereto, substantially as set forth.

3. In dies and taps for cutting screw-threads, the combination of a suitable stock having seats formed therein, one of the sides of each seat having longitudinal serrations formed therein, a chaser having serrations formed on the side thereof adapted to engage the serrations of said seat, the serrations on the side of the seat and the side of the chaser coinciding with the transverse screw-cutting serrations of the chaser, substantially as set forth.

4. In dies and taps for forming screw-threads, the combination of a suitable stock having seats formed therein, the sides of said seats having serrations formed therein, a chaser having serrations on the side thereof engaging said serrations in said seat, a wedge-block having serrations formed thereon adapted to engage the serrations on the opposite side of said seat and means for tightening said wedge-block therein, substantially as set forth.

In testimony whereof I, the said FREDERICK W. ROBERTSHAW, have hereunto set my hand.

FREDERICK W. ROBERTSHAW.

Witnesses:
ROBT. D. TOTTEN,
JOHN N. RADCLIFFE.